(12) United States Patent
Trede (10) Patent No.: US 10,844,833 B2
(45) Date of Patent: Nov. 24, 2020

(54) BLADE ADAPTER FOR WIND TURBINES

(71) Applicant: SENVION GmbH, Hamburg (DE)

(72) Inventor: Alf Trede, Immenstedt (DE)

(73) Assignee: SENVION GmbH, Hamburg (DE)

( * ) Notice: Subject to any disclaimer, the term of this patent is extended or adjusted under 35 U.S.C. 154(b) by 63 days.

(21) Appl. No.: 15/964,431

(22) Filed: Apr. 27, 2018

(65) Prior Publication Data

US 2018/0313326 A1    Nov. 1, 2018

(30) Foreign Application Priority Data

Apr. 27, 2017  (DE) .................. 10 2017 004 056

(51) Int. Cl.
| | | |
|---|---|---|
| *F03D 80/10* | (2016.01) | |
| *F03D 1/06* | (2006.01) | |
| *F03D 7/02* | (2006.01) | |
| *F03D 80/70* | (2016.01) | |

(52) U.S. Cl.
CPC ......... *F03D 1/0658* (2013.01); *F03D 1/0675* (2013.01); *F03D 7/0224* (2013.01); *F03D 80/70* (2016.05); *F05B 2240/202* (2013.01); *F05B 2240/2211* (2013.01); *F05B 2240/313* (2013.01); *F05B 2240/50* (2013.01); *F05B 2250/232* (2013.01); *Y02E 10/72* (2013.01)

(58) Field of Classification Search
None
See application file for complete search history.

(56) References Cited

U.S. PATENT DOCUMENTS

| | | | | |
|---|---|---|---|---|
| 3,734,642 | A * | 5/1973 | Dixon | B64C 11/04 |
| | | | | 416/61 |
| 4,364,708 | A * | 12/1982 | David | F03D 1/0658 |
| | | | | 416/132 B |
| 6,783,326 | B2 | 8/2004 | Weitkamp et al. | |
| 8,172,532 | B2 * | 5/2012 | Wolf | F03D 7/0224 |
| | | | | 416/61 |
| 9,239,040 | B2 | 1/2016 | Leonard | |
| 9,951,815 | B2 * | 4/2018 | Minadeo | F16C 33/60 |
| 2008/0118365 | A1 * | 5/2008 | Bendel | 416/244 R |

(Continued)

FOREIGN PATENT DOCUMENTS

| | | | | |
|---|---|---|---|---|
| DE | | 10140793 A1 | 3/2003 | |
| DE | 202005007450 U1 * | | 7/2005 | ........... F03D 7/0224 |

(Continued)

OTHER PUBLICATIONS

Search Report dated Mar. 6, 2018, directed to DE Application No. 10 2017 004 0561; 8 pages.

*Primary Examiner* — Aaron R Eastman
*Assistant Examiner* — Theodore C Ribadeneyra
(74) *Attorney, Agent, or Firm* — Morrison & Foerster LLP (57) ABSTRACT

A blade adapter for rotor blades of wind turbines, for increasing the rotor diameter, has a first end for attaching to the rotor hub, and a second end, spaced apart in the axial direction, for connecting to the blade root of a rotor blade. In addition, the blade adapter, at its first and second end, has a pitch circle for connecting to the rotor hub or to the rotor blade, wherein the wall of the blade adapter extending in the axial direction is open outwardly, in the form of a truncated cone, from the first end toward the second end, in at least one portion.

19 Claims, 8 Drawing Sheets

(56) References Cited

U.S. PATENT DOCUMENTS

| | | | |
|---|---|---|---|
| 2008/0213095 A1* | 9/2008 | Bech | F03D 1/0658 416/131 |
| 2010/0171317 A1* | 7/2010 | Trede | F03D 1/0658 290/55 |
| 2011/0142645 A1* | 6/2011 | Nunez Polo | F03D 1/0658 416/149 |
| 2012/0134833 A1* | 5/2012 | Mashue | F03D 1/0658 416/204 R |
| 2012/0192391 A1* | 8/2012 | Tobinaga | F03D 7/0224 29/23.51 |
| 2013/0330194 A1 | 12/2013 | Jacobsen et al. | |
| 2014/0084592 A1* | 3/2014 | Pescarmona | F03D 13/10 290/55 |
| 2014/0361547 A1* | 12/2014 | Alti Barbon | F03D 1/0658 290/55 |
| 2014/0377069 A1* | 12/2014 | Minadeo | F03D 1/0658 416/135 |
| 2015/0377212 A1* | 12/2015 | Nohara | F03D 7/0204 416/9 |
| 2016/0356263 A1* | 12/2016 | Schafer | F03D 1/0658 |
| 2017/0002660 A1* | 1/2017 | Samudrala, Sr. | F03D 1/0658 |
| 2017/0002795 A1* | 1/2017 | Nanukuttan | F03D 1/0658 |
| 2017/0022968 A1* | 1/2017 | Caruso | F03D 1/0675 |
| 2017/0030328 A1* | 2/2017 | Gudewer | F03D 80/88 |
| 2017/0045032 A1* | 2/2017 | Jacobsen | F03D 1/0658 |

FOREIGN PATENT DOCUMENTS

| | | |
|---|---|---|
| DE | 202005007450 | 8/2005 |
| DE | 102013101233 | 8/2013 |
| GB | 2517935 | 3/2015 |
| WO | 03/060319 | 7/2003 |
| WO | 2011050806 A2 | 5/2011 |

* cited by examiner

BLADE ADAPTER FOR WIND TURBINES

CROSS-REFERENCE TO RELATED APPLICATIONS

This application claims the priority of German Application No. 10 2017 004 056.7, filed Apr. 27, 2017, the entire contents of which are incorporated herein by reference.

FIELD OF THE INVENTION

The invention relates to a blade adapter for rotor blades of wind turbines, for the purpose of increasing the rotor diameter, and to a wind turbine having such blade adapters.

BACKGROUND OF THE INVENTION

Wind turbines are known from the prior art. They normally comprise a rotor, which is arranged on a nacelle so as to be rotatable about a substantially horizontal axis, the nacelle being arranged on a tower so as to be rotatable about a vertical axis. The rotor drives a generator optionally via a rotor shaft and a transmission. A wind-induced rotational motion of the rotor can thus be converted into electrical energy, which can then, via inverters and/or transformers—also at least partly directly, depending on the design of the generator—be fed into an electricity grid. The rotor comprises a plurality of rotor blades (normally three) that extend substantially radially from the rotor axis. The rotor blades in this case are frequently rotatably attached to a rotor hub, in such a manner that the pitch angle of the rotor blades can be adjusted.

The electrical energy that can be generated by a wind turbine is directly related to the area swept by the rotor, which in turn results directly from the length of the rotor blades. The length of the rotor blades, however, besides being limited by production engineering requirements, is limited in particular by the necessary transportability of the rotor blades. Both for transport over land, for on-shore wind turbines, and over water, for off-shore wind turbines, there are limitations, arising from logistics, for the maximum length of rotor blades.

Known in the prior art, therefore, such as for example GB 2 517 935 A, are so-called "blade extenders", which are arranged between the rotor hub and the actual rotor blades in order to increase the area swept by the rotor. These blade extenders exploit the observation that, even if the blade extenders are of a tubular design that therefore does not generate additional rotor moment, the yield of a wind turbine can be increased overall. Other blade extenders, which also additionally alter the position of the rotor blades relative to the rotor hub, are disclosed, for example, in WO 03/060319 A1 and US 2013/0330194 A1.

However, closer examination of the blade extenders known from the prior art has shown that, when such extenders are used, the forces acting on the rotor hub, and in particular on the bearings provided for the rotation of the rotor blades about their respective rotor axis, are increased and frequently are unevenly distributed over the circumference of the rotor blade bearing. Consequently, there is the risk of increased wear or damage to the rotor blade bearing. In order to prevent this, the rotor blade bearing can in principle be reinforced, as compared with use without blade extenders, but this is generally associated with increased costs and increased weight.

SUMMARY OF THE INVENTION

An object of the present invention is to create a blade adapter for rotor blades of wind turbines, for the purpose of increasing the rotor diameter, and a wind turbine having such a blade adapter, in which the disadvantages from the prior art do not occur, or occur only to a reduced extent.

According to some embodiments, a blade adapter for rotor blades of wind turbines, for increasing the rotor diameter, has a first end for attaching to the rotor hub, and a second end, spaced apart in the axial direction, for connecting to the blade root of a rotor blade, wherein the blade adapter, at its first and second end, in each case has a pitch circle for connecting to the rotor hub or to the rotor blade, and the wall of the blade adapter extending in the axial direction is open outwardly, in the form of a truncated cone, from the first end toward the second end, in at least one portion.

Some embodiments relate to a wind turbine, having a rotor that is rotatable about a substantially horizontal axis, comprising at least two rotor blades attached to a rotor hub, wherein a blade adapter according to the invention is provided in each case between the rotor hub and the individual rotor blades.

Firstly, some terms used in connection with the invention are explained.

"Pitch circle" denotes a circular arrangement of drilled holes that serve to produce a screwed connection. The drill patterns of the parts to be connected by screws must substantially match, such that screws or bolts through the drilled holes of the pitch circle on a first structural element can also be passed into or through corresponding drilled holes on a second structural element. Besides the configuration of the individual drilled holes, for example in respect of the drilled diameter, the arrangement of the drilled holes in the pitch circle is also fundamental. For this purpose, the diameter of the pitch circle, the number of drilled holes and the position of the drilled holes must normally be specified.

According to aspects of the invention, the wall of the blade adapter, which is basically of hollow design, widens in the form of a truncated cone, in at least one portion, in the direction of the end provided for connection of the rotor blade. It has been found that such a shape is advantageous for the transmission of weight and wind forces from the rotor blades to the rotor hub, in particular in respect of a uniform distribution of the load over the circumference of the blade adapter, and therefore in respect of a uniform transmission of force into the rotor blade bearing. It is preferred if the portion of the wall of the blade adapter that is closest to the first end is designed in the form of a truncated cone.

In the portions in which the wall does not widen in the form of a truncated cone in the direction of the end provided for connection of the rotor blade, the wall may be designed in any manner. In particular, in these portions it may run cylindrically and/or conically inward in the direction of the end provided for connection of the rotor blade. i.e. ultimately contrary to the portion in the form of a truncated cone necessarily provided according to the invention. The latter can be particularly favorable for production of the blade adapter as a cast structural element, in particular if the cone angle is at least 0.5°, which can favor demoulding.

It is further preferred that a portion close to the second end of the blade adapter be shaped so as to run substantially cylindrically or conically inward. The mounting of connection means, in particular bolts, in a pitch circle at the second end that is on the inside relative to the wall can thereby be simplified, in that the connection means and the mounting tool can easily be positioned from the inside of the blade adapter.

It is preferred if the total length of the truncated conical portions, in which the wall of the blade adapter is open outwardly, is greater than or equal to the total length of the remaining portions. The total length in this context denotes the summed length of the respective portions in the axial direction. Since the blade adapter, as viewed over its length, is thus realized such that it is at least 50% open, in the form of a truncated cone, toward the second end, the stiffness of the blade adapter is increased in respect of the anticipated forces acting thereon, which further evens out the distribution of the load over the circumference of the blade adapter. It is also possible that the total length of the truncated conical portions corresponds to 100% of the length of the blade adapter.

It is preferred if the two pitch circles have an identical diameter. It is also preferred if the two pitch circles of the blade adapter have an identical diameter of the drilled holes, an identical number of drilled holes and/or an identical position of the drilled holes. Such a design of the two pitch circles in principle enables rotor blades to be connected to the rotor hub optionally with or without a blade adapter. This is because, if the two pitch circles of the blade adapter are substantially identical, a rotor blade that can be connected to the second end of the blade adapter can also easily be connected directly and without a blade adapter to the rotor hub, insofar as the rotor hub is designed for connection to the first end of the blade adapter.

In a preferred embodiment, the wall of the blade adapter is designed in such a manner that the wall of the blade adapter extending in the axial direction runs, at the first end, inside the pitch circle at the first end and, at the second end, runs outside the pitch circle at the second end. Since the axially extending wall of the blade adapter at the first end is located inside the pitch circle at the first end, whereas this wall at the second end runs outside the pitch circle there, in cross section the blade adapter produces a Z-type shape with the wall of the blade adapter and the two pitch circles. It has been found that such a Z shape is particularly advantageous for the transmission of weight and wind forces from the rotor blades to the rotor hub, in particular in respect of a uniform distribution of the load over the circumference of the blade adapter. Furthermore, the position of the pitch circle at the second end inside the wall of the blade adapter offers the advantage that—insofar as the blade adapter is otherwise hollow—a connection, between a rotor blade and a blade adapter, that is produced or to be produced via the pitch circle at the second end is accessible from inside the rotor hub, enabling easy assembling and servicing of this connection.

In the case of the described Z shape of the blade adapter, the half cone angle of the truncated conical portion of the wall of the blade adapter that is closest to the first end is preferably selected in such a manner that, upon connection of the first end of the blade adapter to the outer ring of a rolling bearing for the purpose of rotor blade rotation, the extension of the middle surface of the wall of the blade adapter in this truncated conical portion goes through the rolling elements of the rolling bearing. If the truncated conical wall of the blade adapter is designed correspondingly, it is thereby ensured that the main flux of force from the rotor blade to the rotor hub goes directly through the rolling elements of the rolling bearing, such that unfavorable loads, particularly upon the outer ring of the rolling bearing, which in extreme cases can result in increased wear, or a reduced service life, of the rolling bearing, are avoided.

In an alternative preferred embodiment, the wall of the blade adapter is designed in such a manner that the outer side of the wall runs outside the pitch circles at the first and the second end. In cross section through the blade adapter, this produces a C-type shape with the wall of the blade adapter and the two pitch circles. This shaping offers the advantage that—particularly insofar as both pitch circles are realized with through-holes—a connection, between a rotor blade, or the rotor hub, and a blade adapter, that is produced or to be produced via one of the pitch circles is accessible from inside the blade adapter, and therefore from the rotor hub, enabling easy assembling and servicing of this connection.

In the case of the described C shape of the blade adapter, it is preferred if the portion of the wall of the blade adapter that is closest to the first end is designed in such a manner that, upon connection of the first end of the blade adapter to the inner ring of the rotor blade bearing, the extension of the middle surface of the wall of the blade adapter in this portion goes through the rolling elements of the rolling bearing. It is thereby ensured that the main flux of force from the rotor blade to the rotor hub goes directly through the rolling elements of the rolling bearing, such that unfavorable loads upon the rolling bearing are avoided.

Irrespective of the cross-sectional shape, reinforcements, by which the stiffness of the blade adapter can be selectively further increased, may be provided on the inner side of the wall, in the region of the pitch circles. The reinforcements in this case may comprise ribs running in the axial direction of the blade adapter, and/or stiffening rings running in a perpendicular to the axis of the blade adapter. Ribs extending in the axial direction of the blade adapter can generally improve the flux of force in the blade adapter and, if arranged in the region of the first end of the blade adapter, the flux of force from the blade adapter into the rotor hub, or into a rotor blade bearing provided there. A stiffening ring running perpendicularly in relation to the axis of the blade adapter, particularly if arranged at an end of the blade adapter, can counteract a deformation of the pitch circle at the respective end caused by loading.

Preferably, the wall of the blade adapter may be thickened in the region of an at least one pitch circle, wherein the wall is preferably thickened on the side that faces away from the pitch circle. In other words, the wall has a greater wall thickness in the region of the respective pitch circle, the increase in the wall thickness preferably being on the side of the wall that faces away from the pitch circle. Such a thickening makes it possible to improve the lever ratios for the screws or bolts passed through the pitch circle, and to reduce load peaks.

Furthermore, within the blade adapter, at least one circular platform, running perpendicularly in relation to the axis of the blade adapter, may be provided with an opening, which circumferentially sits closely to the wall, and the opening of which preferably can optionally be closed by a cover element. The opening may be arranged centrally, such that an annular platform is produced. The platform serves, on the one hand, as a work platform, for example for producing and/or servicing a connection to a rotor blade at the second end of the blade adapter. On the other hand, since it can be optionally closed by the cover element, it serves as protection, such that no solid particles such as, for example, adhesive residues, or condensate water from the interior of the rotor blade, can get into the rotor hub. The platform can be attached, for example on support surfaces or attachment openings provided for the purpose, to the wall of the blade adapter.

The drilled holes of at least one pitch circle may be designed as through-holes or blind holes. In particular, if the drilled holes are realized as blind holes, they are preferably provided with an internal thread.

The pitch circles are preferably arranged on L-flanges connected to the wall of the blade adapter. The blade adapter may be realized as a cast structural element or as a welded construction. In the former case, the L-flanges are realized integrally with the wall of the blade adapter; in the latter case the L-flanges may be welded to the wall of the blade adapter. The blade adapter is preferably made from steel.

In the case of the wind turbine according to some embodiments, blade adapters according to the invention are in each case provided between the rotor hub and the individual rotor blades. These blade adapters are connected by their first end to the rotor hub, and by their second end to the blade root of the respective rotor blade, such that the above-mentioned advantages are obtained, or at least can be obtained in principle.

The rotor blades of the wind turbine in this case are each mounted on the rotor hub so as to be rotatable about a rotor axis. Owing to the stiffness that can be achieved in the region of the connection with a blade adapter according to the invention, which is normally significantly above the stiffness of a rotor blade in the region of its blade root, the forces acting upon the rotor blade bearings can be distributed more uniformly over the circumference, such that load peaks in the rotor blade bearing can be reduced.

In particular in the case of a blade adapter having a Z-shaped cross section, as described above, the rotor blade adapters are in each case preferably connected by their first end to the outer ring of the rolling bearings provided for this purpose at the rotor hub.

BRIEF DESCRIPTION OF THE DRAWINGS

The invention is now described exemplarily on the basis of advantageous embodiments, with reference to the appended drawings. There are shown.

DETAILED DESCRIPTION OF THE INVENTION

Figure 1:
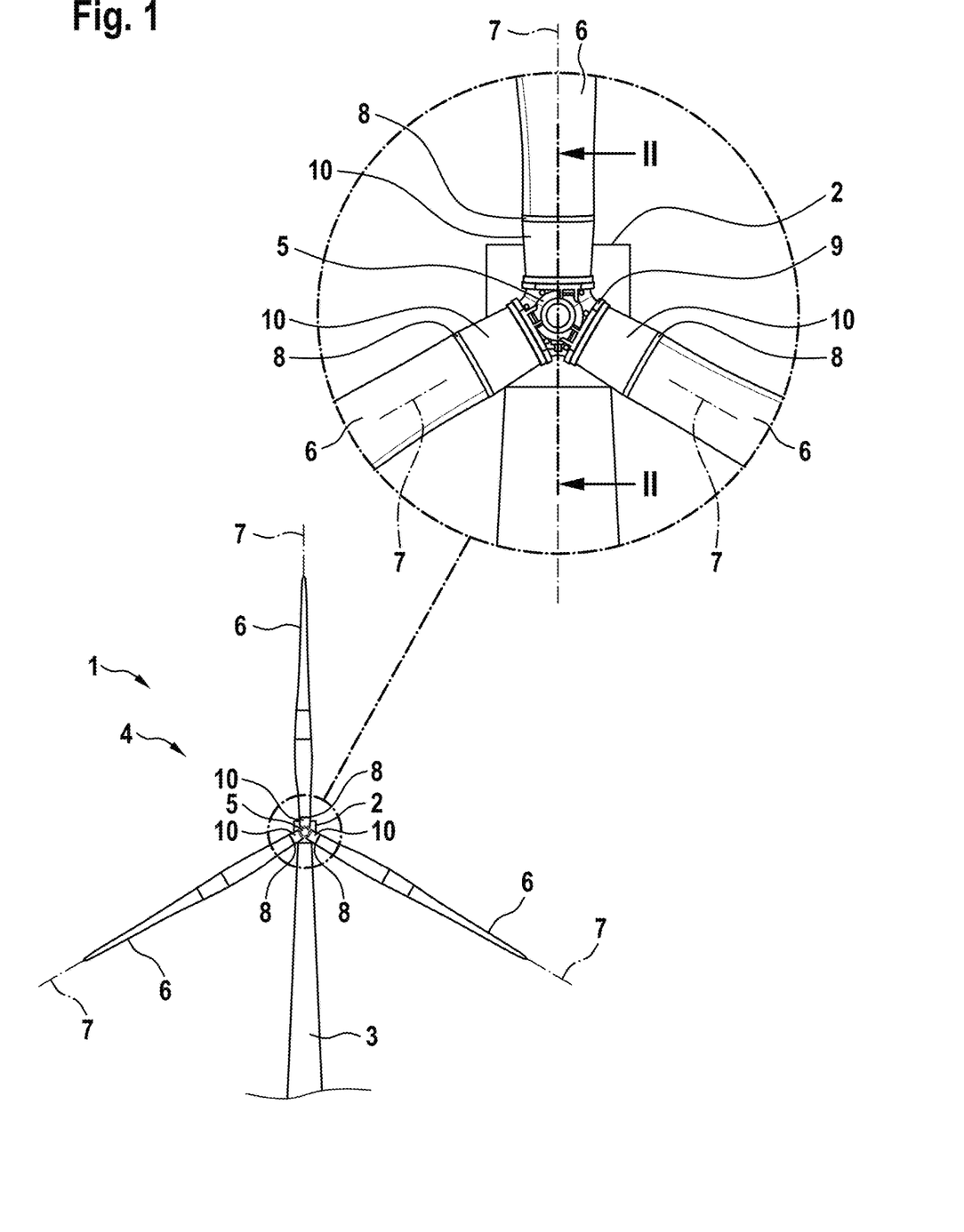
FIG. 1 shows a schematic representation of a wind turbine according to the invention having blade adapters according to the invention.

A wind turbine 1 according to the invention is represented schematically in FIG. 1. The wind turbine 1 comprises a rotor 4, which is arranged on a nacelle 2 so as to be rotatable about a rotor axis, perpendicularly in relation to the blade axis, and which can drive a generator (not represented) present in the nacelle 2. For the purpose of altering the azimuthal orientation of the rotor 4, the nacelle 2 is arranged on the tower 3 so as to be rotatable about a perpendicular axis.

The rotor 4 comprises three rotor blades 6, attached to a rotor hub 5, which are each rotatable about a rotor blade axis 7 for the purpose of setting the blade pitch angle. Blade adapters 10 according to the invention are provided between the respective blade roots 8 of the rotor blades 6 and the rotor hub 5.

Figure 2:
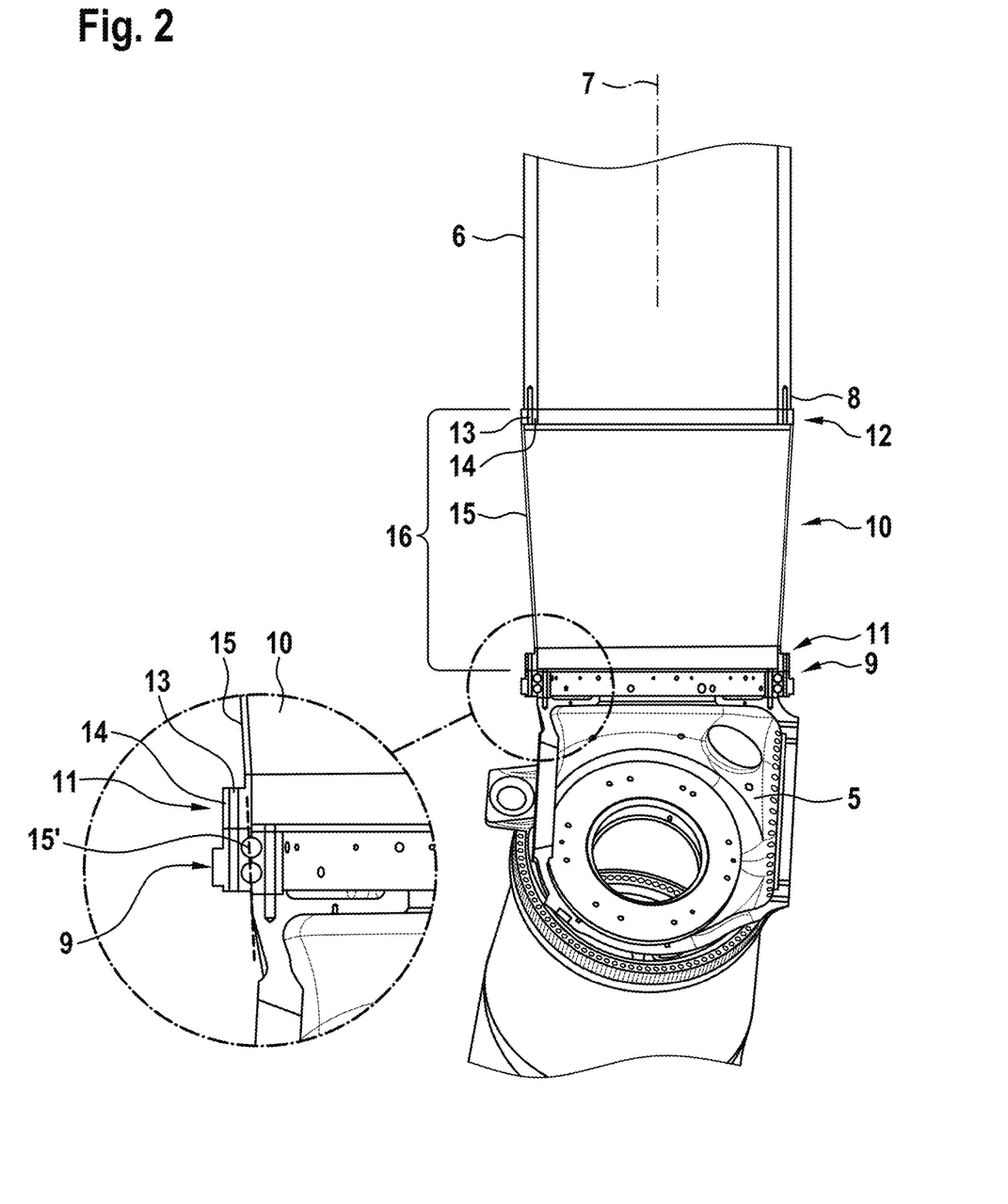
FIG. 2 shows a sectional view through the rotor from FIG. 1, along the section line II-II from FIG. 1.

The blade adapters 10 are now explained in greater detail on the basis of FIG. 2, in which the blade adapter 10 of the rotor blade 7, pointing upward in FIG. 1, is shown by way of example in section. The other blade adapters 10 are identical to it.

Both at its first end 11 and at its second end 12, the blade adapter 10 has a respective pitch circle 13. Via the pitch circle 13 at its first end, the blade adapter 10 is connected to the rotor hub 5, more precisely to the outer ring of the rotor blade bearing 9, which enables rotation about the rotor blade axis 7. The rotor blade bearing 9 is realized as a rolling bearing. In the exemplary embodiment represented, the rotor blade bearing 9 is a double-row ball bearing.

The two pitch circles 13 are realized such that they are identical to one another, i.e., in addition to an identical diameter, they also have an identical drill diameter, number of drilled holes, and position of the drilled holes. This offers the advantage that, if necessary, the rotor blade 6 represented in FIGS. 1 and 2 can also be attached without a blade adapter 10 to the rotor hub 5, such that no special rotor blades 6 or rotor hubs 5 are required for such a wind turbine configuration. The drilled holes of both pitch circles 13 are designed as through-holes.

The two pitch circles 13 are each arranged on L-flanges 14, but with the pitch circle 13 at the second end 12, starting from the wall 15 of the blade adapter 10, being directed inward, the pitch circle 13 at the first end 11 being directed outward. Owing to the identical diameter of the pitch circles 13, this can only be achieved in that the wall 15 of the blade adapter 10 is designed in the form of a truncated cone in a portion 16, the wall 15 of the blade adapter 10 in this portion 16 widening outward starting from the rotor hub 5. The truncated conical portion 16 extends practically over the entire length of the blade adapter 10.

Owing to the truncated conical portion 16 of the wall 15 of the blade adapter 10, a high degree of stiffness is obtained, such that loads caused by the rotor blade 6 are transferred, distributed evenly over the circumference of the blade adapter 10, into the rotor blade bearing 9. In the case of the blade adapter 10 represented in FIG. 2, the half cone angle of the truncated conical portion 16 of the wall 15 that is closest to the first end 11 of the blade adapter 10 is furthermore selected in such a manner that, upon connection to the outer ring of the rotor blade bearing 9, the extension of the middle surface of the wall 15 of the blade adapter 10 in this portion 16 (represented by the broken line 15' in FIG. 2) goes through the rolling elements of the rotor blade bearing 9. The load on the rotor blade bearing 9 is thereby further reduced.

Last but not least, since the pitch circle 13, or the flange 14, at the second end 12 is directed inward, the bolted or screwed connections between the rotor blade 6 and the blade adapter 10 are accessible from inside the rotor hub 5, or from inside the blade adapter 10, which greatly simplifies producing and servicing precisely this connection. Owing to its direct proximity to the rotor hub 5, the outer connection at the first end 11 of the blade adapter 10 is likewise easy to produce or service.

The blade adapter 10 from FIGS. 1 and 2 is produced as a cast part, from steel. In principle, however, it is also possible to make the blade adapter 10 as a welded construction.

Figure 3:
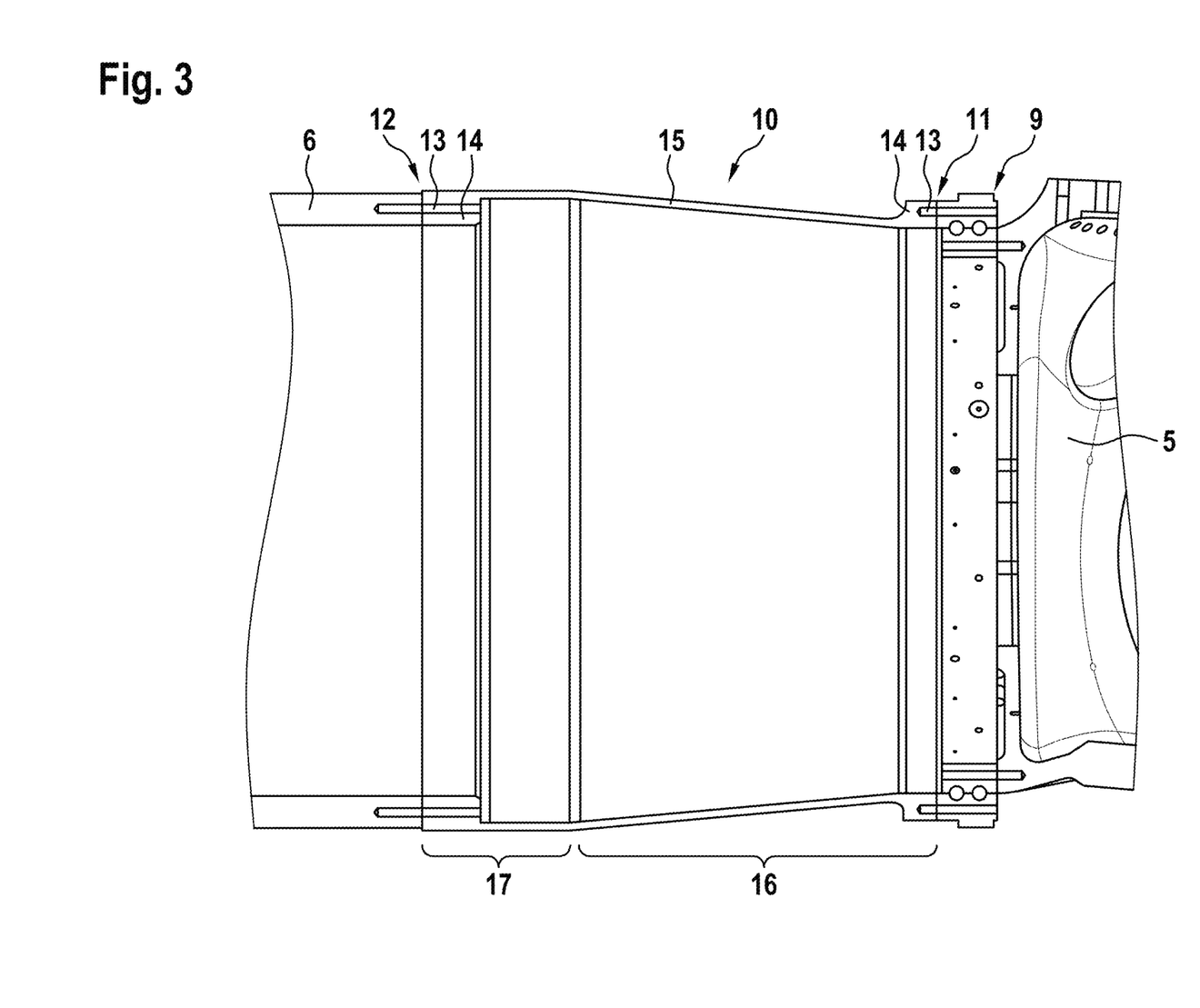
FIG. 3 shows a schematic representation of an embodiment variant of the blade adapter from FIGS. 1 and 2.

Shown in FIG. 3 is an embodiment variant of the blade adapter 10 from FIGS. 1 and 2. Since the blade adapter 10 in FIG. 3 is to a large extent the same as that from FIGS. 1 and 2, reference is made to the above statements, and only the differences are described in the following.

In the case of this embodiment variant, the truncated conical portion 16 does not extend over the entire length of the blade adapter. Instead, a cylindrical portion 17 is provided in the region of the second end 12, in order to create sufficient space, on the inner side of the wall 15, to enable screws or bolts to be passed through the openings of the pitch circle 13 and fastened with appropriate tools. However, since the truncated conical portion 16 makes up the great majority of the length of the blade adapter 10 and, moreover, is also adjacent to the first end 11 of the blade adapter 10, the advantages, known from the exemplary embodiment according to FIGS. 1 and 2, of increased stiffness of the blade adapter 10 and improved transmission of force into the rotor blade bearing 9 are maintained.

The drilled holes of the pitch circle 13 at the first end 11 of the blade adapter 10 are designed as blind holes, and have an internal thread. Accordingly, the connection between the rotor hub 5 and the blade adapter 10 is effected by means of a stud screw or a stud bolt, and not by means of a through-screw or through-bolt. Nevertheless, the pitch circles 13 are matched to one another in such a manner that, here likewise, a direct connection of the rotor hub 5 and the rotor blade 6—omitting the blade adapter—is possible.

Figure 4:
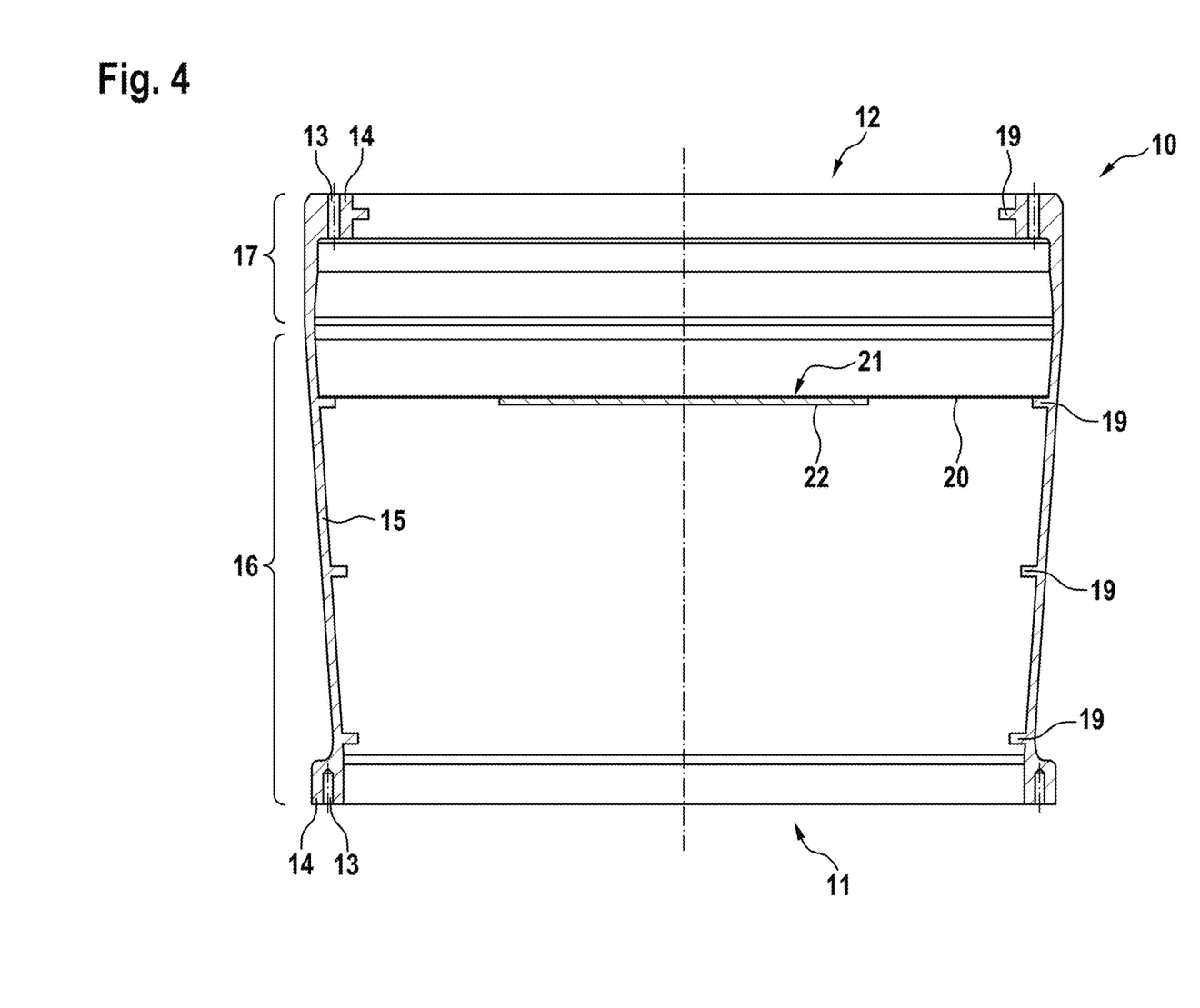
FIG. 4 shows a sectional view of a second exemplary embodiment of a blade adapter according to the invention.

A further exemplary embodiment of a blade adapter 10 according to the invention is represented in FIG. 4. The blade adapter 10 in this case is comparable in structure to that from FIG. 3, for which reason reference is made to the statements relating thereto. In particular, the blade adapter 10, besides having a truncated conical portion 16 has a cylindrical portion 17.

Furthermore, provided on the inner side of the wall 15, at differing heights, are circumferential supports 19, on each of which an annular platform 20 can be fastened in such a manner that it runs perpendicularly in relation to the axis of the blade adapter 10. The platform 20 in this case extends as far as the wall 15, and has a central opening 21. This central opening 21 can optionally be closed by a cover element 22. If a connection at the pitch circle 13 at the second end 12 of the blade adapter 10 is produced or checked, the cover element 22 can be removed, in order thus to uncover the central opening 21 as an access for a fitter who, in turn, can move on the platform 20. Otherwise, the cover element 22 closes the opening 21, in order to prevent solid particles such as, for example, adhesive residues, or condensate water from the interior of the rotor blade, from falling through into the rotor hub.

Figure 5A:
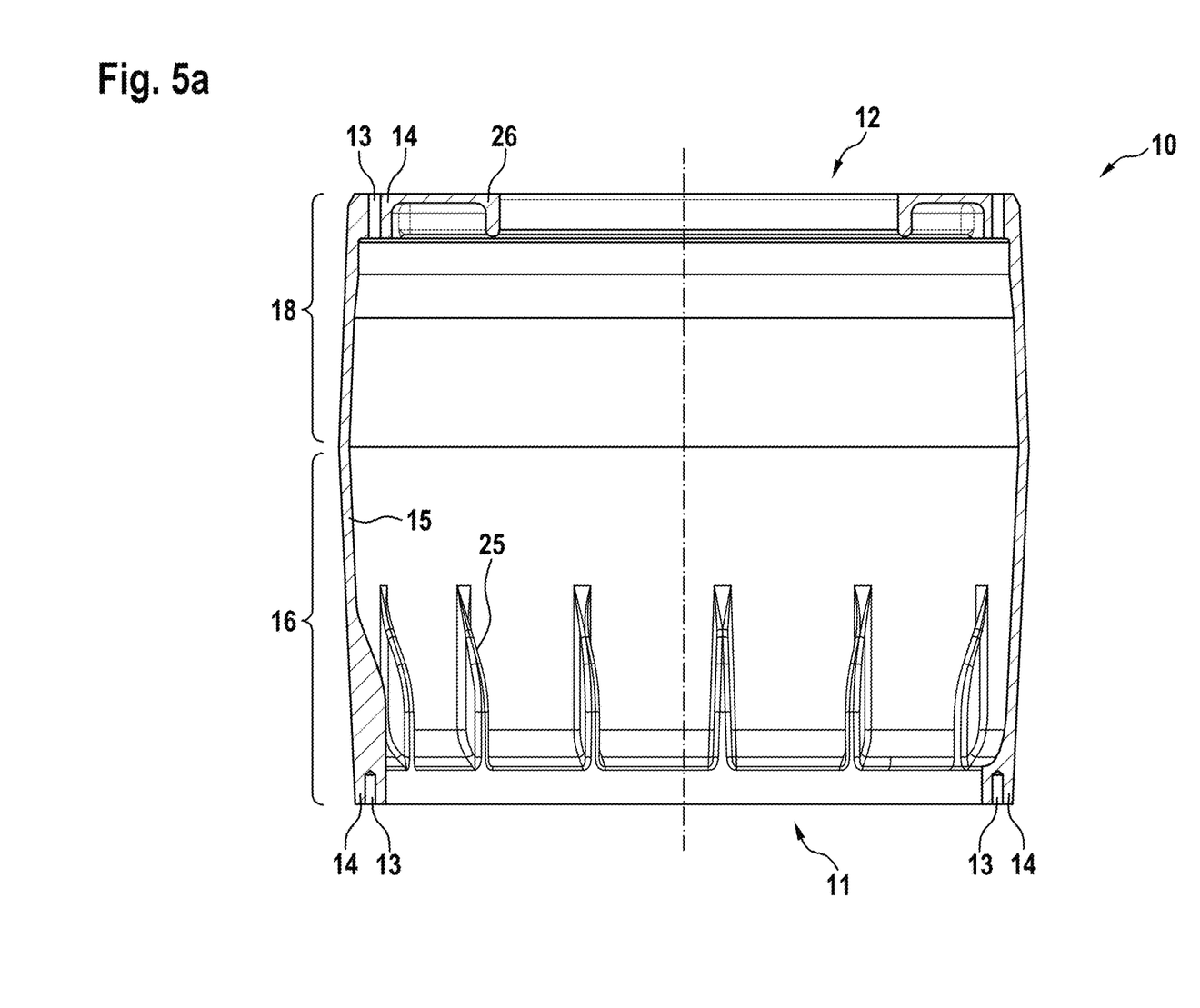
FIGS. 5a-c show differing views of a third exemplary embodiment of a blade adapter according to the invention.
Figure 5B:
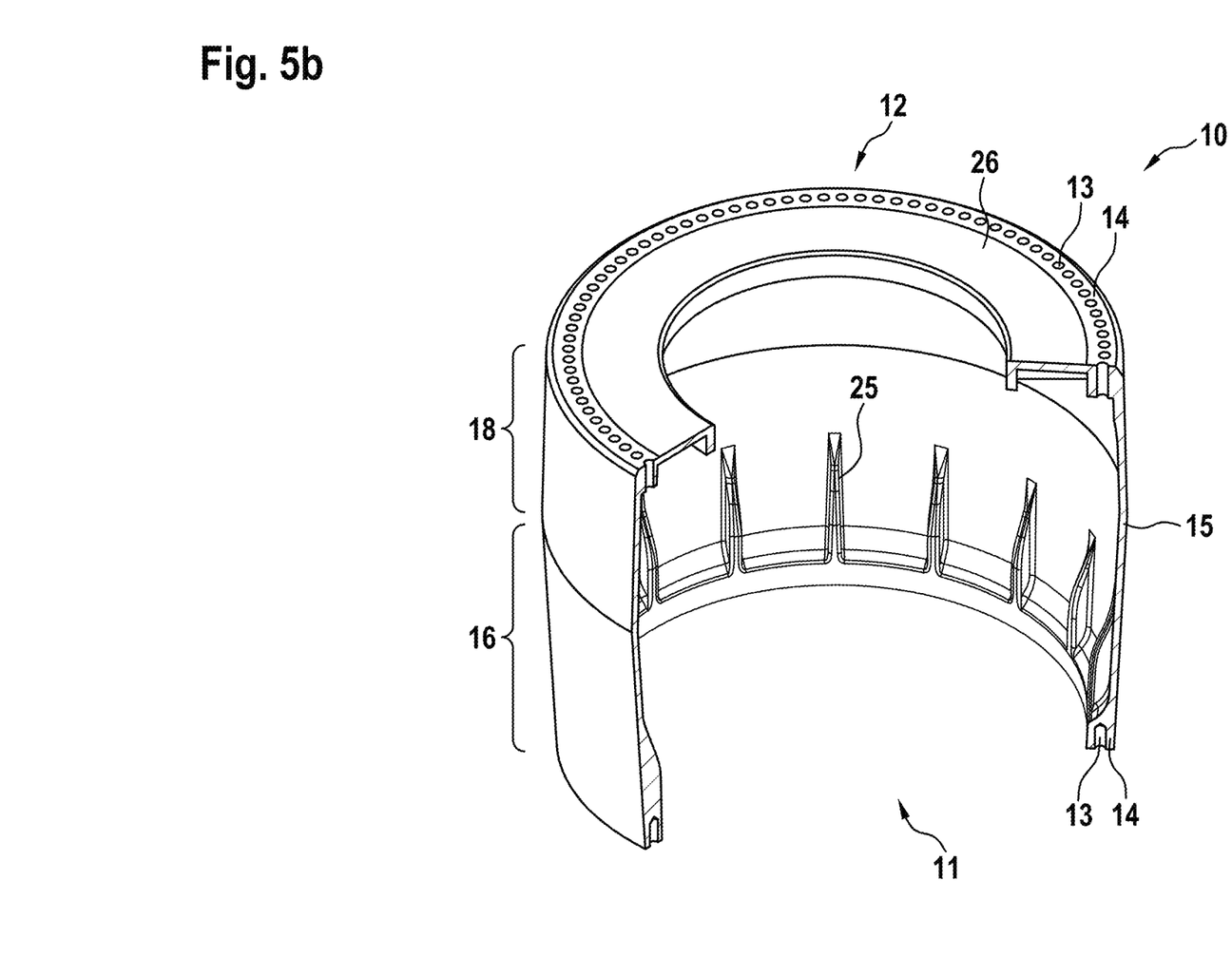
Figure 5C:
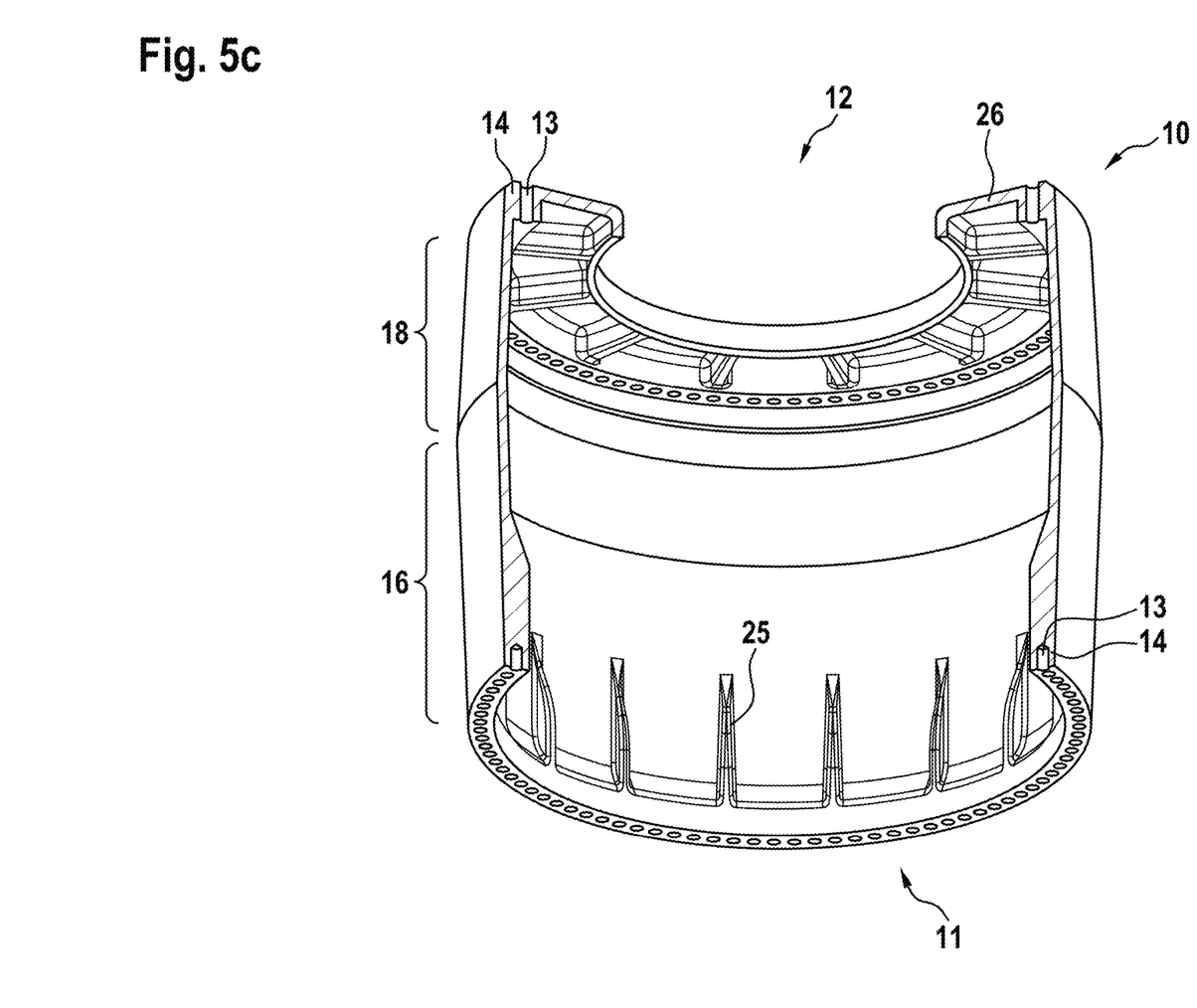

In the case of the blade adapter 10 in FIGS. 5a-c, the wall 15, or in particular its outer side—unlike the preceding exemplary embodiments—runs outside the pitch circle 13, both at the first end 11 and at the second end 12 (C-type shape). Moreover, although, clearly, a truncated conical portion 16 is provided, in which the wall 15 widens out from the first end 11 toward the second end 12, the wall 15 in the remaining portion 18 is nevertheless conical in form, in such a manner that the widening out from the first portion 16 is partially taken back again. This double conical shape is particularly advantageous for production of the blade adapter 10 in a casting process. Moreover, stiffenings are also provided in the region of the two ends 11, 12 of the blade adapter 10. At the first end 11, the stiffening is achieved by a multiplicity of axially running ribs 25; provided at the second end 12 is a stiffening ring 26 running perpendicular to the axis of the blade adapter 10, in this example in the form of a car-wheel type geometry.

The stiffening ring 26 at the second end 12 increases the stiffness for the connection of a rotor blade 6. The ribs 25 provide sufficient stiffness upon connection of the blade adapter 10, for example at the outer ring of a rotor blade bearing 9, i.e. in particular if the extension of the middle surface of the wall 15 of the blade adapter 10 in the portion 16 adjacent to the first end 11 does not go directly through the rolling elements of the rotor blade bearing 9. However, if the blade adapter 10 is connected to the inner ring of a rotor blade bearing 9, it may also be possible to dispense with such a stiffening, since in this case—like the detail drawing in FIG. 3—the extension of the middle surface of the wall 15 of the blade adapter 10 in the portion 16 adjacent to the first end 11 can go through the rolling elements of the rotor blade bearing 9. It is thereby ensured that the main flux of force from the rotor blade 6 to the rotor hub 5 goes directly through the rolling elements of the rotor blade bearing 9, such that, even without the provision of ribs 25, unfavorable loads upon the rotor blade bearing 9 are already avoided.

Figure 6:
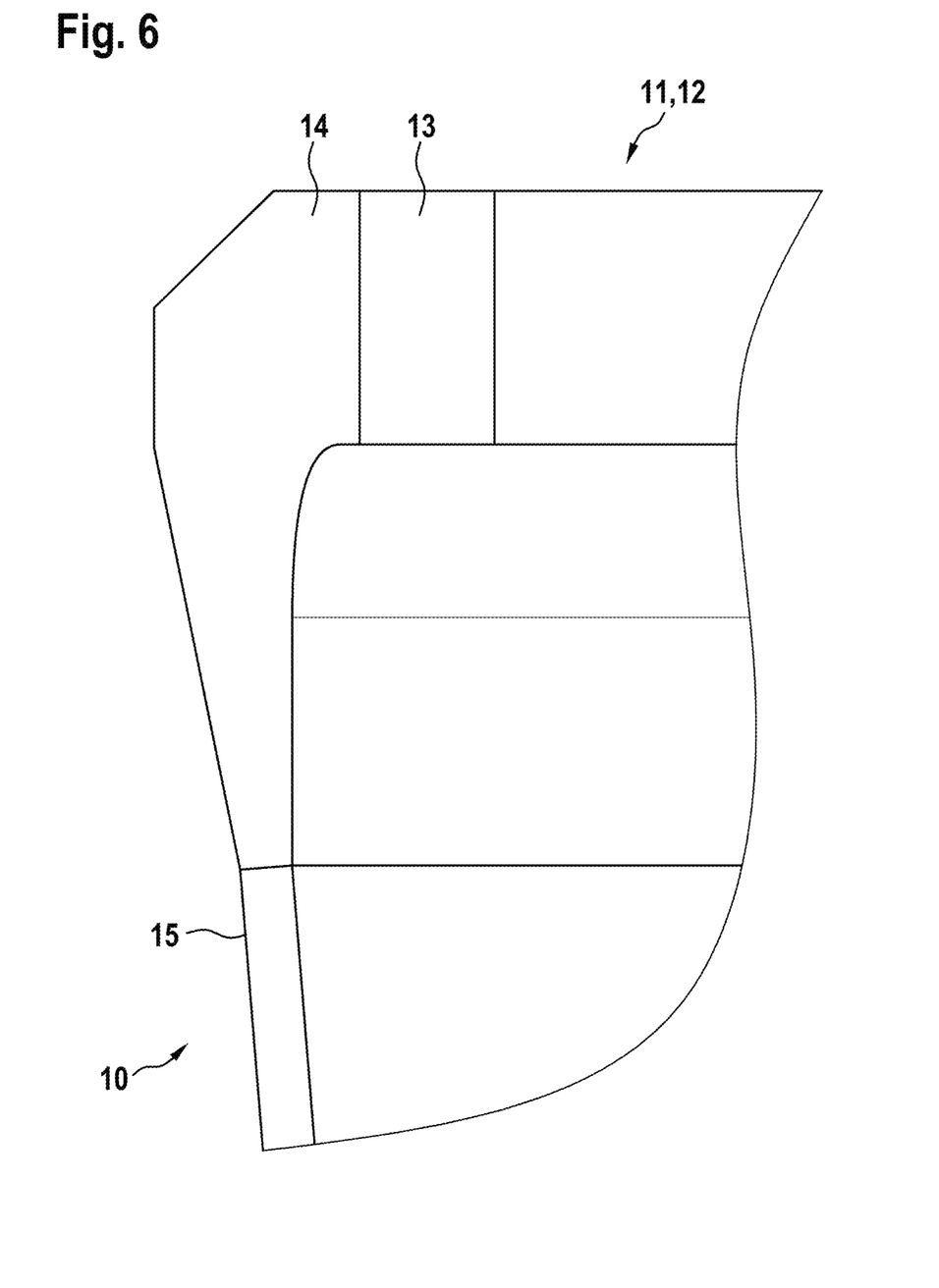
FIG. 6 shows a detail representation of a design variant of the flange at the first and/or second end of a blade adapter.

Shown in FIG. 6 is a design variant of the wall 15 in the region of the flange 14 at an end of the blade adapter 10, this design variant being able to be provided at the first end 11 and/or second end 12 of the blade adapter 10. According to this design variant, the wall 15 running cylindrically in the region in question is covered on the side that faces away from the flange 14 arranged thereon, or from the pitch circle 13 formed therein, as a result of which more favorable lever ratios are obtained for the screws or bolts passed through the pitch circle 13, and a significant reduction in load peaks can be achieved. Represented in FIG. 6 is the thickening for a pitch circle 13 that is on the inside of the wall 15 of the blade adapter 10, in which the thickening is thus located on the outer side of the blade adapter 10. However, it is also possible to design the thickening differently, for example, in the case of an outer pitch circle 13, to provide the thickening on the inner side of the blade adapter 10.

The invention claimed is:

1. A blade adapter for increasing rotor diameter of a wind turbine, the blade adapter comprising:
    a first end comprising a first pitch circle for connecting to a rotor hub of the wind turbine;
    a second end spaced apart in an axial direction from the first end and comprising a second pitch circle for connecting to a blade root of a rotor blade of the wind turbine; and
    a wall extending in the axial direction between the first end and the second end, wherein at least a portion of the wall tapers outwardly in a direction from the first end toward the second end in the form of a truncated cone, and wherein the wall is configured such that, at the first end, the wall is inside the first pitch circle and, at the second end, the wall is outside the second pitch circle.

2. The blade adapter of claim 1, wherein a portion of the wall opens outwardly in the form of a truncated cone from the first end toward the second end and a total length of the portion of the wall is greater than or equal to a total length of a remaining portion of the wall.

3. The blade adapter of claim 1, wherein the two pitch circles have an identical diameters.

4. The adapter of claim 3, wherein the two pitch circles have drilled holes with identical diameters.

5. The adapter of claim 3, wherein the two pitch circles have an identical number of drilled holes.

6. The adapter of claim 3, wherein the two pitch circles have an identical position of the drilled holes.

7. The blade adapter of claim 1, wherein a half cone angle of a truncated conical portion of the wall that is closest to the first end is configured such that, upon connection of the first end to an outer ring of a rotor blade roller bearing, an extension of a middle surface of the truncated conical portion of the wall passes through rolling elements of the rotor blade roller bearing.

8. The blade adapter of claim 1, wherein, in a region of at least one pitch circle, reinforcements are provided on an inner side of the wall, wherein the reinforcements comprise ribs extending in the axial direction or stiffening rings running perpendicular to an axis of the blade adapter.

9. The blade adapter of claim 1, wherein the wall thickens in a region of at least one of the pitch circles.

10. The adapter of claim 9, wherein the wall thickens on a side that faces away from the at least one of the pitch circles.

11. The blade adapter of claim 1, further comprising, within the blade adapter, at least one circular platform that extends perpendicularly relative to an axis of the blade adapter, and includes an opening that is disposed close to the wall at a circumference of the opening.

12. The adapter of claim 11, wherein the central opening is closeable by a cover element of the adapter.

13. The blade adapter of claim 1, wherein drilled holes of at least one pitch circle are configured as through-holes or blind holes.

14. The adapter of claim 13, wherein the drilled holes include internal threads.

15. The blade adapter of claim 1, wherein the pitch circles are arranged on L-flanges fixedly connected to the wall of the blade adapter.

16. The blade adapter of claim 1, wherein the blade adapter is cast or welded.

17. A wind turbine, comprising a rotor that is rotatable about a substantially horizontal axis, the rotor comprising at least two rotor blades attached to a rotor hub, wherein each rotor blade is attached to the rotor hub by a blade adapter that comprises:
   a first end comprising a first pitch circle for connecting to the rotor hub;
   a second end spaced apart in an axial direction from the first end and comprising a second pitch circle for connecting to a blade root of a respective rotor blade; and
   a wall extending in the axial direction between the first end and the second end, wherein at least a portion of the wall tapers outwardly in a direction from the first end toward the second end in the form of a truncated cone, and wherein the wall is configured such that, at the first end, the wall is inside the first pitch circle and, at the second end, the wall is outside the second pitch circle.

18. The wind turbine of claim 17, wherein the rotor blades are rotatably mounted on the rotor hub.

19. The wind turbine of claim 18, wherein each rotor blade adapter is connected by the first end to an outer or an inner ring of rotor blade bearings.

* * * * *